United States Patent [19]

Belder et al.

[11] Patent Number: 5,326,832
[45] Date of Patent: Jul. 5, 1994

[54] POWDER PAINT AND A POLYESTER RESIN FOR POWDER PAINT

[75] Inventors: Eimbert G. Belder; Fokeltje A. Koldijk; Frits Visser; Tosko A. Misev; Albertus R. Hofkamp; Marten Houweling, all of Zwolle, Netherlands

[73] Assignee: DSM N.V., Netherlands

[21] Appl. No.: 908,882

[22] Filed: Jul. 7, 1992

Related U.S. Application Data

[63] Continuation of Ser. No. 497,023, Mar. 22, 1990, abandoned.

[30] Foreign Application Priority Data

Mar. 23, 1989 [NL] Netherlands ................ 8900718
Jun. 3, 1989 [NL] Netherlands ................ 8901412

[51] Int. Cl.$^5$ ............................................. C08L 67/02
[52] U.S. Cl. ............................... 525/438; 525/448; 525/934
[58] Field of Search ........................... 525/438, 934

[56] References Cited

U.S. PATENT DOCUMENTS 1,100,204 1/1981 Weemes et al.
4,085,159 4/1978 Marsiat.
4,288,569 9/1981 Rottmaier et al.

FOREIGN PATENT DOCUMENTS 0024680 3/1981 European Pat. Off.
0025478 3/1981 European Pat. Off.
0085640 8/1983 European Pat. Off.
0110456 6/1984 European Pat. Off.
2515208 10/1976 Fed. Rep. of Germany.
2309596 11/1976 France.
2189498 10/1987 United Kingdom.

Primary Examiner—Patricia A. Short
Attorney, Agent, or Firm—Cushman, Darby & Cushman

[57] ABSTRACT

The invention relates to a powder paint, comprising a polyepoxy compound, a polyester resin and customary additives, the polyester resin having an acid number ranging from 15 through 70 and a hydroxyl number of 10 or below and being substantially based on units of dicarboxylic acids, glycols and monomers of functionality three or higher, wherein the dicarboxylic acids are comprised of at least 15 mole % of isophthalic acid and at least 5 mole % of 1,4-cyclohexane dicarboxylic acid and wherein the glycols are comprised of at least 50 mole % of branched aliphatic glycols with 5-11 carbon atoms, which may optionally comprise an ester group, and at most 50 mole % of aliphatic glycol with 2-6 carbon atoms, and wherein the monomers have a functionality three or higher in an amount of at most 8 mole % of dicarboxylic acids plus glycols.

6 Claims, No Drawings

POWDER PAINT AND A POLYESTER RESIN FOR POWDER PAINT

This is a continuation of application Ser. No. 07/497,023, filed on Mar. 22, 1990, abandoned, which was abandoned upon the filing hereof of the present FWC application.

The invention relates to a thermosetting powder paint comprising an epoxy resin, a polyester resin and customary additives. The invention also relates to a polyester resin which is suitable for powder paint composition.

A polyester resin for a powder paint that is cured with epoxy resin generally has an acid number ranging from 15 through 70 mg KOH/gram polyester, a hydroxyl number of 10 mg KOH/gram polyester or below and is substantially based on units of aromatic dicarboxylic acids, such as terephthalic acid and isophthalic acid, and aliphatic glycols, such as neopentylglycol and the ester of neopentylglycol and hydroxypivalic acid, besides a minor amount of trifunctional monomer.

Such polyester resins are decribed in, for instance, U.S. Pat. No. 4,379,895. Although the specification of U.S. Pat. No. 4,379,895 refers to isophthalic acid as a possible monomer for the preparation of a polyester resin, it was found that powder paints with polyester resins based on isophthalic acid did not yield a paint coat with good impact resistance.

Further, DSM Resins (Netherlands) marketed a polyester resin for powder paint, which resin consisted roughly of equimolar quantities of isophtalic acid and terephtalic acid as dicarboxylic acids and neopentylglycol as aliphatic glycol.

Although such a resin based on isophthalic acid combined with an epoxy resin such as triglycidyl isocyanurate (TGIC), yields a powder paint which, after curing, gives relatively good weathering resistance in comparison with powder paints based on polyester resins composed of at least 70 mole % of terephthalic acid and 30 mole % or less of isophthalic acid. The drawback of such a resin, however, is that its mechanical properties are insufficient for a number of applications, particularly when a relatively short curing time is used.

The object of the invention is to provide a powder paint, and a polyester resin for a powder paint, which, as cured paint, yields good UV resistance in combination with good mechanical properties, the good mechanical properties being reached after a relatively short curing time.

According to the invention this is accomplished by means of a powder paint comprising polyepoxy resin, a polyester resin and customary additives, the polyester resin having an acid number ranging from between 15 through 70 and a hydroxyl number of 10 or below and being substantially based on units of dicarboxylic acids, glycols and monomers of functionality three or higher, as dicarboxylic acids use being made of at least 15 mole % isophthalic acid, and at least 5 mole % of 1,4-cyclohexane dicarboxylic acid, as glycols use being made of at least 50 mole % of branched aliphatic glycols with 5–11 carbon atoms, which may optionally contain an ester group, and at most 50 mole % of aliphatic glycols with 2–6 carbon atoms, and wherein the monomers have a functionality three or higher in an amount of at most 8 mole % of dicarboxylic acids plus glycols.

The essence of the invention is that 1,4-cyclohexane dicarboxylic acid has an unexpected influence on the impact resistance of the coating. Previous attempts to improve the impact resistance of a polymer based on isophthalic acid, while retaining the other properties, using a monomer known to improve impact resistance, in general, such as adipic acid, had failed, as is also apparent from the comparative experiments.

According to a preferred embodiment of the invention the polyester resin is substantially based on units of dicarboxylic acids, glycols and monomers of functionality of three or higher, as dicarboxylic acids use being made of at least 75 mole % of isophtalic acid and at least 5 mole % of 1,4-cyclohexane dicarboxylic acid.

Very good results have been obtained with an acid polyester resin based on 75–90 mole % of isophthalic acid and 10–25 mole % of 1,4-cyclohexane dicarboxylic acid.

According to another preferred embodiment of the invention the polyester resin is substantially based on units of dicarboxylic acids, glycols and monomers of functionality of three or higher, as dicarboxylic acids use being made of at least 10 mole % 1,4-cyclohexane dicarboxylic acid and at most 65 mole % terephtalic acid.

Very good results have been obtained with an acid polyester resin based on 45–65 mole % terephtalic acid, 15–35 mole % isophtalic acid and 15–30 mole % 1,4-cyclohexane dicarboxylic acid.

By preference use is made of at least 90 mole % of the above-mentioned dicarboxylic acids (isophthalic acid, 1,4-cyclohexane dicarboxylic acid and optionally terephthalic acid) taken together.

Other polycarboxylic acids can, in addition, be applied in amounts of at most 20 mole %, by preference up to maximum 10 mole % of the total of carboxylic acids. These are, for instance, tetrahydrophthalic acid, hexahydroendomethylene tetrahydrophthalic acid, azelaic acid, sebacic acid, decanedicarboxylic acid, dimer fatty acid, adipic acid, succinic acid, maleic acid, benzene-1,2,4-tricarboxylic acid, pyromellitic acid, trimesic acid, 3,6-dichlorophthalic acid and tetrachlorophthalic acid. Hydroxy carboxylic acids and/or optionally lactones, too, can be applied, for instance 12-hydroxystearic acid or epsilon-caprolactone. In minor amounts, at most 5 mole %, also monocarboxylic acids such as benzoic acid, tert. butylbenzoic acid, hexahydrobenzoic acid and saturated aliphatic monocarboxylic acids can be added during the preparation.

The amount of branched aliphatic glycol with 5–11 carbon atoms preferably 70 mole % or more, and more in particular 90 mole % or more since such an amount yields better weatherproof products.

Within the above-mentioned limits, as aliphatic diols use may be made, besides the above-mentioned glycols, of for instance ethylene glycol, propane-1,2-diol, propane-1,3-diol, hexane-2,5-diol, hexane-1,6-diol, 2,2-[bis (4-hydroxy-cyclohexyl)]-propane 1,4-dimethylolcyclohexane, and 2,2,4-trimethyl pentane diol-1,3 and smaller amounts of polyols, such as glycerol, hexane triol, pentaerythritol, sorbitol, trimethylol ethane, trimethylol propane and tris-(2-hydroxyethyl)-isocyanurate. It is also possible to use epoxy compounds instead of diols, and the same holds for polyols.

The polyester resins are prepared by esterification or interesterification, optionally in the presence of customary catalysts such as, for instance, di-butyltin oxide or tetrabutyl titanate. When the processing conditions and COOH/OH ratio are suitably chosen, end products with an acid number ranging from 15 through 70, are obtained. In case use is being made of more than 75 mole % of isophtalic acid as the dicarboxylic acid end products with an acid number ranging from 45 through 55 are obtained. The polyester resins preferably have almost no free hydroxyl groups left, i.e. the hydroxyl number is 10 or lower, preferably 5 mg KOH/g or lower.

The polyester resins preferably have a glass transition temperature (Tg) between 40° C. and 80° C., more in particular between 50° C. and 70° C. This is important for the storage stability of the powder paint.

The amount of monomer of functionality three or higher is preferably in the range of 0.2 mole % through 6 mole % relative to the other monomers, in particular in the range of 0.5 mole % through 4.5 mole %. The molecular weight of the polyester preferably ranges from 2,500 through 7,000, more in particular from 3,000 through 5,000. By preference, the molecular weight combined with the amount of branching is chosen such that the functionality of the polyester ranges from 2.1 through 3.5.

As crosslinking agent use is made of an epoxy resin with a functionality of 2 or more. Preferably epoxy compounds are used that do not comprise a phenolic carbon-oxygen bond, this bond being light-sensitive. As such, preferably trisglycidylisocyanurate (TGIC), diglycidyl terephthalate or the hexahydro derivative are eligible. The amount of epoxy compound used in the powder paint depends on the acid number of the polyester resin with which it is combined, and ranges from 0.8 through 1.2, preferably from 0.9 through 1.1 epoxy equivalents per carboxyl equivalent. This amounts to an epoxy resin: polyester resin weight ratio between 4:96 and 15:85.

The polyester resin and the epoxy resin are homogeneously mixed, preferably in the melt, using an extruder. As a rule the customary additives are mixed in before extrusion. This is especially the case with flow agents, curing catalysts and optionally pigments and/or fillers. The extrudate is subsequently cooled ground and screened, and the fraction with a particle size 90 micron or below is applied to a substrate by means of an electrostatic spraying device and stoved for 10 to 30 minutes at a temperature ranging from 160° through 200° C. The paint coat of the wholly or partly coated substrate thus obtained exhibits an excellent combination of gloss, flow and mechanical properties, as well as exceptionally good UV resistance, as is illustrated also by the following examples.

EP-A-24680 describes a powder lacquer binder comprising a carboxylated polymer and triglycidyltriazolidine. The carboxylated polymer can be chosen from many acids. There is nowhere an indication to use the very specific carboxylfunctional polyester according to the present invention which comprises 1,4-cyclohexane dicarboxylic acid.

EP-A-25478 describes a solvent based thermosetting coating based on a mixture of a binder based on aminoplasts and hydroxyfunctional polyesters and organic solvents. This application does not relate to powder coatings. Furthermore, the present invention relates to a very specific carboxylfunctional polyester.

EXAMPLES I-VI

Preparation of a Polyester Resin

A 3-liter reactor vessel fitted with a thermometer, a stirrer and a distillation device, was filled with the monomers listed (in moles) in Table 1. Stirring was then applied and a light nitrogen flow was passed over the reaction mixture while the temperature was being raised to 200° C., with water formation. The temperature was gradually raised further to a maximum of 250° C., and the water was distilled off. The reaction was continued until the acid number of the polyester was below 10 mg KOH/g.

Subsequently, the monomer for the second step was added and esterification was continued to an acid number (AN) as shown in Table 2. The latter part of this process was carried out under reduced pressure. Table 2 presents the acid number as well as the viscosity ($\eta$), measured according to Emila rheometer (in dPa.s, D=17.6s-1, 165° C.) and the glass transition temperature)Tg, Mettler TA-3000 system, 5° C./min).

TABLE 1

| | Moles of monomers | | | | | |
|---|---|---|---|---|---|---|
| | I | II | III | IV | V | VI |
| 1st step | | | | | | |
| IPA 1) | 9.18 | 10.86 | 10.38 | 10.01 | 10.01 | 9.28 |
| CHDA 2) | 1.33 | 1.57 | 1.09 | 1.45 | 1.45 | 2.17 |
| NPG 3) | 10.76 | 12.18 | 11.47 | 11.46 | 11.46 | 11.45 |
| TMP 4) | 0.75 | 1.25 | 1.00 | 1.00 | 1.00 | 1.00 |
| 2nd step | | | | | | |
| IPA | 2,75 | 3,25 | 3,00 | 3,00 | 3,00 | 3,00 |

1) isophthalic acid
2) 1,4-cyclohexane dicarboxylic acid
3) neopentylglycol
4) trimethylolpropaan

TABLE 2

| | I | II | III | IV | V | VI |
|---|---|---|---|---|---|---|
| Theoretical Mn | 3000 | 3540 | 3000 | 3000 | 3000 | 3000 |
| Functionality | 2.75 | 3.25 | 3.00 | 3.00 | 3.00 | 3.00 |
| AN | 54 | 56 | 56 | 54 | 51 | 55 |
| $\eta$ | 245 | 650 | 575 | 490 | 533 | 405 |
| $T_g$ | 56 | 62 | 62 | 61 | 59 | 57 |

EXAMPLE VII

Powder Paint Preparation 540 g of each of the granulated polyester resins according to the Examples I-VI was dry-blended with 60 g triglycidyl isocyanurate, 300 g titanium dioxide pigment (ex-Kronos, Type Cl 310), 9 g Resiflow PV-5 (a polyacrylate flow agent, ex-Worle), 4.5 g benzoin, and optionally a small amount of catalyst for setting of the gelling time, and then placed in an extruder unit (make Buss, Type PR 46 or a Werner and Pfleiderer, ZSK 30). The extrudate was cooled, ground and screened, the screen fraction <90 micrometer being collected for use as powder paint. This powder paint was electrostatically sprayed onto steel panels that had previously been degreased with trichloroethane. Use was made of electrostatical spraying equipment of make Gema, Type HP 720. After spraying with powder paint, the panels were stored at a temperature of 200° C., the residence time being as specified in Table 3. Then the following properties were assessed:

gloss (Gardner 20° C. and 60° C., ASTM-D-523-67)

mechanical properties (Reverse Impact, ASTM-D-2794-69): at 11 kg/cm2=higher than 160 psi
flow (visual assessment)
QUV (ASTM-G-53, lamp: UVB-313).
The results are presented in Table 3.

TABLE 3

|  | I | II | III | IV | V | VI |
|---|---|---|---|---|---|---|
| Stoving time | 15 | 10 | 10 | 10 | 12 | 8 |
| Reverse impact* | g | g | g | g | g | g |
| Flow* | g/vg | g | g/vg | g/vg | g/vg | g/vg |
| Gloss |  |  |  |  |  |  |
| 20° C. | 83 | 82 | 72 | 83 | 79 | 82 |
| 60° C. | 94 | 91 | 89 | 89 | 91 | 91 |
| QUV (60° C.) | — | 1000 | — | 1100 | 1000 | 1000 |
| Powderstability* | m | g | g | f | f | m |
| Gelling time | 90 | 550 | 95 | 70 | 69 | 70 |

*:
p: poor
m: moderate
f: fair
g: good
vg: very good

With the powder paints according to the invention cured paint coats are obtained which, after 10 to 15 minutes' curing at 200° C., have a QUV (60° C.) higher than 1000 and a good reverse impact.

COMPARATIVE EXPERIMENT A

In the same way as in the examples described above, an experiment was conducted using a monomer that generally has a flexibility improving effect: adipic acid (AA).

The monomers are specified in Table 4, the properties of the polyester in Table 5, and the results of the paint in Table 6.

TABLE 4

| Monomers (in moles) | |
|---|---|
| 1st step | |
| IPA | 10.09 |
| AA | 0.5 |
| NPG | 10.84 |
| TMP | 0.75 |
| 2nd step | |
| IPA | 2.75 |

TABLE 5

| Polyester properties | |
|---|---|
| Theoretical Mn | 3000 |
| Functionality | 2.75 |
| AN | 52 |
| η | 270 |
| Tg | 56 |

TABLE 6

| Paint properties | |
|---|---|
| Stoving time | 20 |
| Reverse impact* | m |
| Flow* | g |
| Gloss |  |
| 20° | 72 |
| 60° | 85 |
| Powder stability* | m |
| Gelling time | 108 |

*See Table 3 for the meaning of the abbreviations

In this experiment no satisfactory reverse impact was obtained.

EXAMPLES VIII–XIV

Preparation of a Polyester Resin

A 3-liter reactor vessel, equipped with a thermometer, a stirrer and a distillation device, was filled with the monomers listed (in moles) in Table 7. Next, while a light nitrogen flow was led over the reaction mixture with stirring, the temperature was raised to 200° C., causing water to be formed. The temperature was gradually raised further to a maximum of 250° C. and the water was distilled off. The reaction was continued until the acid number of the polyester was 10 mg KOH/g or less.

Next the monomer for the second step was added and further esterified to an acid number (AN) as stated in Table 8. The last part of this process was carried out at reduced pressure. Besides the acid number, Table 8 shows the viscosity (n), measured with an Emila rheometer (in dPa.s, D=17,6 s-1, 165° C.), and the glass transition temperature (Tg, Mettler TA-3000 system, 5° C./min.).

TABLE 7

| | Monomers in moles | | | | | | |
|---|---|---|---|---|---|---|---|
| | VIII | IX | X | XI | XII | XIII | XIV |
| 1st step | | | | | | | |
| IPA | 3.57 | 2.83 | 4.56 | 2.09 | 1.80 | 1.56 | |
| TPA[5] | 8.87 | 9.63 | 10.63 | 10.37 | 9.67 | 9.11 | 10.67 |
| CHDA | 2.60 | 2.60 | — | 2.60 | 3.47 | 4.34 | 4.43 |
| NPG | 15.71 | 15.71 | 15.83 | 15.71 | 15.68 | 15.66 | 15.66 |
| TMP | 0.35 | 0.35 | 0.35 | 0.35 | 0.35 | 0.35 | 0.35 |
| 2nd step | | | | | | | |
| IPA | 2.35 | 2.35 | — | 2.35 | 2.35 | 2.35 | 2.35 |
| CHDA | — | — | 2.35 | — | — | — | — |
| monomer ratio | | | | | | | |
| IPA | 34 | 30 | 26 | 25 | 24 | 23 | 14 |
| TPA | 51 | 55 | 61 | 60 | 56 | 52 | 61 |
| CHDA | 15 | 15 | 13 | 15 | 20 | 25 | 25 |

[5]TPA = terephtalic acid

TABLE 8

| | VIII | IX | X | XI | XII | XIII | XIV |
|---|---|---|---|---|---|---|---|
| AN | 38 | 33 | 38 | 37 | 35 | 34 | 39 |
| η | 340 | 360 | 360 | 380 | 340 | 360 | 185 |
| Tg | 59 | 60 | 57 | 63 | 58 | 55 | 55 |

EXAMPLE XV

Preparation of the Powder Paint 558 g of the granulated polyester resin according to the Examples VIII–XIV was dry mixed with 42 g triglycidyl isocyanurate, 300 g titanium dioxide pigment (from Kronos, type Cl 310), 9 g Resiflow PV-5 (a polyacrylate flow agent from Worlée) and 4.5 g benzoin, and then introduced into an extrusion device (make Buss, type PR 46, or a Werner and Pfleiderer, ZSK 30). The extrudate was cooled, ground and screened; the size fraction smaller than 90 micrometers was collected and used as powder paint. This powder paint was electrostatically applied onto steel panels, which had been previously degreased with trichloroethane. This was done by means of an electrostatic spraying device, make Gema, type HP 720. The panels thus sprayed were placed in an oven and stored at 200° C. for a number of minutes as stated in table 3. Then the following properties were assessed: gloss (Gardner 20° and 60°, ASTM-D-523-67);

mechanical properties (reverse impact ASTM-D-2794-69): at 11 kg/cm2=higher than 160 psi;
flow (visual assessment);
QUV (ASTM-G-53, lamp: UVB-313).
The results are given in Table 9.

TABLE 9

|  | I | II | III | IV | V | VI | VII |
|---|---|---|---|---|---|---|---|
| Stoving time | 15 | 10 | 10 | 15 | 10 | 10 | 10 |
| Reverse Impact* | g | g | g | g | g | g | g |
| Flow* | g | g | g | g | g | g | g |
| Gloss |  |  |  |  |  |  |  |
| 60° | 90 | 91 | 85 | 91 | 91 | 89 | 87 |
| 20° | 80 | 83 | 75 | 81 | 80 | 75 | 73 |
| QUV (hr) | 760 | 760 | 760 | 750 | 750 | 750 | 702 | g: good

With the powder paints according to the invention, hardened paint coats are obtained, after curing for 10 to 15 minutes at 200° C., with a QUV higher than 700 and a good reversed impact.

COMPARATIVE EXAMPLES B-G AND EXAMPLE H

Analogously to the examples described above, experiments were conducted. The monomers started from, the properties of the polyester and the paint are shown in Tables 10, 11 and 12 respectively. This series only relates to polyester resins based on isophthalic acid and terephthalic acid, and (experiment H) with 7% CHDA.

TABLE 10

|  | monomers (moles) |  |  |  |  |  |  |
|---|---|---|---|---|---|---|---|
|  | B | C | D | E | F | G | H |
| 1st step |  |  |  |  |  |  |  |
| IPA | 17.48 | — | — | — | — | 6.38 | 4.14 |
| TPA | — | 4.37 | 8.74 | 13.11 | 15.12 | 8.74 | 9.74 |
| CHDA | — | — | — | — | — | — | 1.22 |
| NPG | 15.77 | 15.77 | 15.77 | 15.77 | 15.77 | 15.77 | 15.74 |
| TMP | 0.35 | 0.35 | 0.35 | 0.35 | 0.35 | 0.35 | 0.35 |
| 2nd step |  |  |  |  |  |  |  |
| IPA | — | 13.11 | 8.74 | 4.37 | 2.36 | 2.36 | 2.35 |

TABLE 11

|  | Polyester resin properties |  |  |  |  |  |  |
|---|---|---|---|---|---|---|---|
| 1st step | B | C | D | E | F | G | H |
| AN | 35 | 35 | 36 | 38 | 36 | 35 | 36 |
| η | 300 | 310 | 320 | 390 | 610 | 360 | 370 |
| Tg | 62 | 63 | 67 | 65 | 70 | 66 | 61 |

TABLE 12

| 1st step | B | C | D | E | F | G | H |
|---|---|---|---|---|---|---|---|
| Stoving time | 10 | 10 | 15 | 10 | 10 | 15 | 15 |
| reversed impact* | p | p | r | g | g | scr | r |
| flow* | rg | rg | g | rg | rg | rg | g |
| gloss |  |  |  |  |  |  |  |
| 60° | 86 | 88 | 91 | 88 | 89 | 90 | 65 |
| 20° | 72 | 72 | 78 | 75 | 77 | 81 | 86 |
| QUV (hr) | 1260 | 1080 | 700 | 510 | 520 | 755 | 750 |

*meaning of symbols:
p: poor
r: reasonable
g: good
scr: small cracks

These tests show that with 70 mol. % TPA or more the impact resistance is good, but the QUV is only around 500 hours. If 50 or more mol. % IPA is used, the QUV is over 700, but the impact resistance is poor to reasonable. The use of a small quantity of CHDA does not improve the reversed impact to a sufficient degree.

COMPARATIVE EXAMPLES I-L

Analogously to the examples described above, experiments were conducted with different monomers which in general have a flexibility enhancing effect, such as cyclohexane dimethanol (CHDM), the ester of hydroxypivalic acid and neopentylglycol (Ester-diol: ED), adipic acid (AA) and succinic acid anhydride (BZA). The monomers are listed in Table 13, the properties of the polyester resin in Table 14 and the results of the paint in Table 15.

TABLE 13

|  | Monomers (moles) |  |  |  |
|---|---|---|---|---|
|  | I | J | K | L |
| 1st step |  |  |  |  |
| IPA | 6.06 | 5.64 | 5.52 | 4.16 |
| TPA | 8.42 | 7.99 | 7.86 | 9.76 |
| AA | — | — | 2.00 | — |
| BZA | — | — | — | 1.50 |
| NPG | 12.35 | 1075 | 16.02 | 16.07 |
| TMP | 0.35 | 0.35 | 0.35 | 0.35 |
| CHDM | 3.78 | — | — | — |
| ED | — | 3.52 | — | — |
| 2nd step |  |  |  |  |
| IPA | 2.35 | 2.35 | 2.35 | 2.35 |

TABLE 14

|  | Polymer properties |  |  |  |
|---|---|---|---|---|
|  | I | J | K | L |
| AN | 38 | 36 | 34 | 37 |
| η | 710 | 180 | 165 | 250 |
| Tg | 69 | 54 | 48 | 59 |

TABLE 15

|  | Paint properties |  |  |  |
|---|---|---|---|---|
|  | I | J | K | L |
| stoving time | 25 | 25 | 12 | 15 |
| reversed impact* | p | p | p | scr | p |
| flow* | g | g | g | g | g |
| gloss |  |  |  |  |
| 60° | 85 | 88 | 60 | 60 | 83 |
| 20° | 68 | 75 | 85 | 85 | 63 |
| QUV (hr) | 480 | 900 | 2200 | 1225 |

*see Table 12 for meaning of the abbreviations

In none of the experiments I-L a satisfactory reversed impact was obtained.

We claim:
1. Powder paint comprising a polyepoxy compound, a polyester resin and customary additives, the polyester resin having an acid number ranging from 15 through 70 and a hydroxyl number of 10 or below and being substantially based on units of dicarboxylic acids, glycols and monomers of functionality three or higher, wherein the dicarboxylic acids are comprised of 75-90 mole % of isophthalic acid and 10-25 mole % of 1,4-cyclohexane dicarboxylic acid and wherein the glycols are comprised of at least 50 mole % of branched aliphatic glycols with 5-11 carbon atoms, which may optionally comprise an ester group, and at most 50 mole % of aliphatic glycol with 2-6 carbon atoms, and wherein the monomers have a functionality three or higher in an amount of at most 8 mole % of dicarboxylic acids plus glycols.

2. Powder paint according to claim 1, wherein the polyester resin is based on glycols which consist of more than 70 mole % of $C_5$-$C_{11}$ aliphatic branched alcohol, wherein said alcohol may comprise an ester group.

3. Powder paint according to claim 1, wherein said polyepoxy compound does not contain a phenolic carbon-oxygen bond.

4. Powder paint according to claim 3, wherein said polyepoxy compound is triglycidylisocyanurate.

5. Powder paint according to claim 1, wherein the weight ratio of said polyepoxy compound to said polyester resin is between 4:96 to 15:85.

6. Wholly or partly coated substrate, wherein the coating is comprised of a powder paint according to claim 1.

* * * * *